Feb. 3, 1948. R. J. PETTINGILL 2,435,463
ADJUSTABLE BATTERY CARRIAGE
Filed March 25, 1946

Inventor
R. J. Pettingill

Patented Feb. 3, 1948

2,435,463

UNITED STATES PATENT OFFICE 2,435,463

ADJUSTABLE BATTERY CARRIAGE

Russell J. Pettingill, Superior, Wis.

Application March 25, 1946, Serial No. 656,914

2 Claims. (Cl. 180—68.5)

This invention relates to new and useful improvements in adjustable battery carriages.

In automobiles now generally in use, the battery is mounted under the floor board, and consequently, exposed to all kinds of weather, dirt and gravel.

The primary object of my invention is to provide an adjustable battery carriage designed to be bolted to the front of the dash board, under the hood of the car, thereby not only protecting the battery from unseasonable weather, but providing greater accessibility and permitting shorter cables to be used.

A further object of my invention is to provide a battery carriage that is readily adjustable to any size battery now on the market.

A still further object of my invention is to provide a battery carriage that is simple and economical in construction, and highly efficient and durable in use.

With the foregoing and other objects in view that will appear as the nature of my invention is better understood, the same consists in the novel features of construction, combination and arrangement of parts illustrated in the accompanying drawing and more particularly pointed out in the appended claims.

In the accompanying drawing, which is for illustrative purposes only and is therefore not drawn to scale:

Referring to the drawing for a more particular description of my invention, and in which drawing like parts are designated by like reference characters throughout the several views, A designates the dash board of the automobile, B the battery and C my novel adjustable battery carriage, as a whole.

Figure 1:
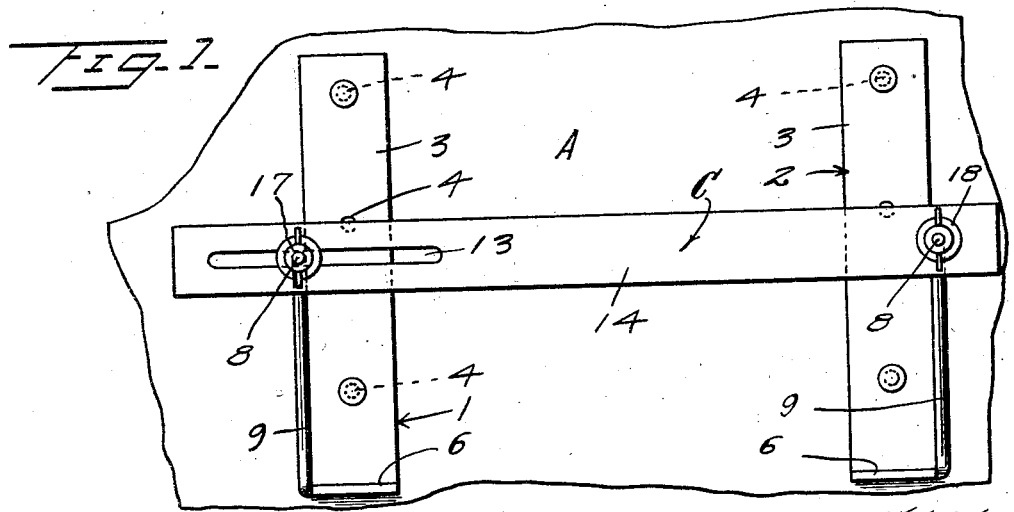
Figure 1 is a front elevation, illustrating the application of my invention.
Figure 2:
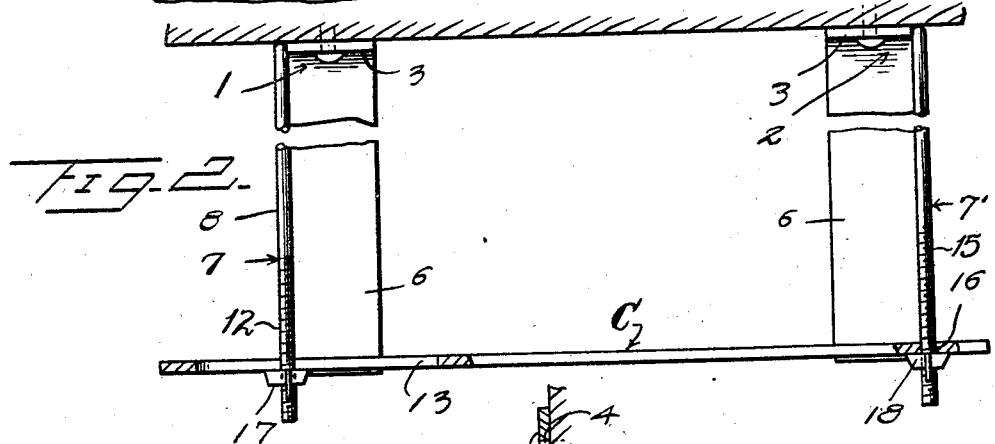
Figure 2 is a plan view, with parts broken away, and partly in section.
Figure 3:
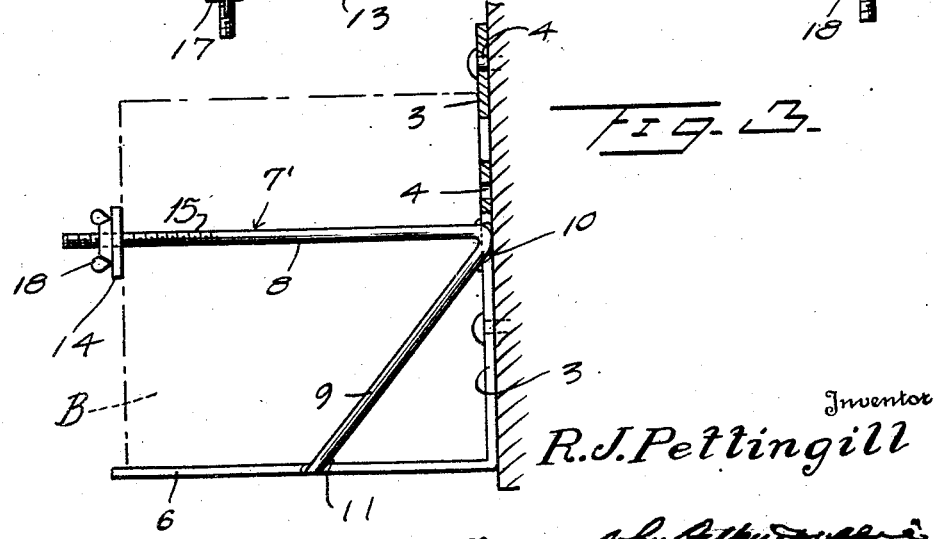
Figure 3 is an end view, partly in section.

Specifically, my battery carriage comprises a pair of corresponding flat laterally spaced metal supporting brackets 1 and 2, of right-angular form, whose vertical portions 3 are bolted, as at 4, or otherwise fastened to the front of the dash board A under the hood of the car, and whose forwardly extending horizontal portions 6 provide a base or support for the bottom of the battery.

In carrying out my invention, each of the supporting brackets is provided with a V-shaped end guard or piece, designated 7 and 7', respectively, and each of said end guards is formed from a single rod bent to form the straight horizontal top portion 8 and the diagonally disposed bottom portion 9. Each end guard is welded at its apex, as at 10, to the outer edge and center of the corresponding supporting bracket, with the front end of the bottom portion 9 thereof welded, as at 11, to the outer edge of the horizontal portion 6 of the bracket.

The outer end of the horizontal top portion of one of the V-shaped end guards is exteriorly threaded, as at 12, and extends through a longitudinal slot 13 formed in the adjacent end of the front cross bar 14, while the outer end of the horizontal top portion of the other end guard is also exteriorly threaded, as at 15, and extends through a corresponding transverse opening 16 in the opposite end of said cross bar. Thumb nuts 17 and 18 are screwed on the threaded ends 12 and 15 of the horizontal top portions 8 of the end guards or pieces 7 to hold the front cross bar 14 in place.

Attention is invited to the fact that the longitudinal slot 13 in one end of the front cross bar 14, permits the supporting bracket 1 to be adjusted laterally with respect to the bracket 2 to accommodate and fit any length of battery. When the battery is in place, the ends of the latter fit against the end guards 7 and the battery is held firmly in place by the front cross bar 14.

From the foregoing description taken in connection with the drawings, it is thought that the construction, operation and advantages of my invention will be readily understood, without requiring a more extended explanation.

Having described my invention, what I claim as new and desire to secure by Letters Patent is:

1. A battery carriage comprising a pair of corresponding laterally spaced supporting brackets of right-angular form, adapted to be bolted to the dash board of an automobile, under the hood, V-shaped end guards welded to the supporting brackets, a front cross bar co-acting with said end guards in holding the battery in place, and means for adjustably connecting one of the end guards with one end of the front cross bar, whereby the corresponding supporting bracket is susceptible of lateral adjustment to accommodate batteries of different lengths.

2. A battery carriage comprising a pair of corresponding laterally spaced supporting brackets, consisting of straight flat inner vertical portions adapted to be bolted to the dash board of an automobile under the hood, and straight flat outwardly extending integral horizontal portions, V-shaped end guards welded to the inner vertical and horizontal portions of the supporting brackets, with one end threaded and free, a front cross bar formed at one end with a longitudinal slot to receive the threaded end of one end guard and in its opposite end with a transverse opening to receive the threaded end of the other end guard, and thumb nuts screwing on the threaded ends of the end guards against said front cross bar.

RUSSELL J. PETTINGILL.

REFERENCES CITED

The following references are of record in the file of this patent:

UNITED STATES PATENTS

| Number | Name | Date |
| --- | --- | --- |
| 927,956 | Draper | July 13, 1909 |
| 1,607,598 | Andrews | Nov. 23, 1926 |
| 2,009,199 | Pehotsky | July 23, 1935 |
| 2,257,155 | Bowers | Sept. 30, 1941 |